Feb. 24, 1948.  H. N. FERGUSON  2,436,510
TREE PULLING APPARATUS
Filed March 24, 1945  2 Sheets-Sheet 1
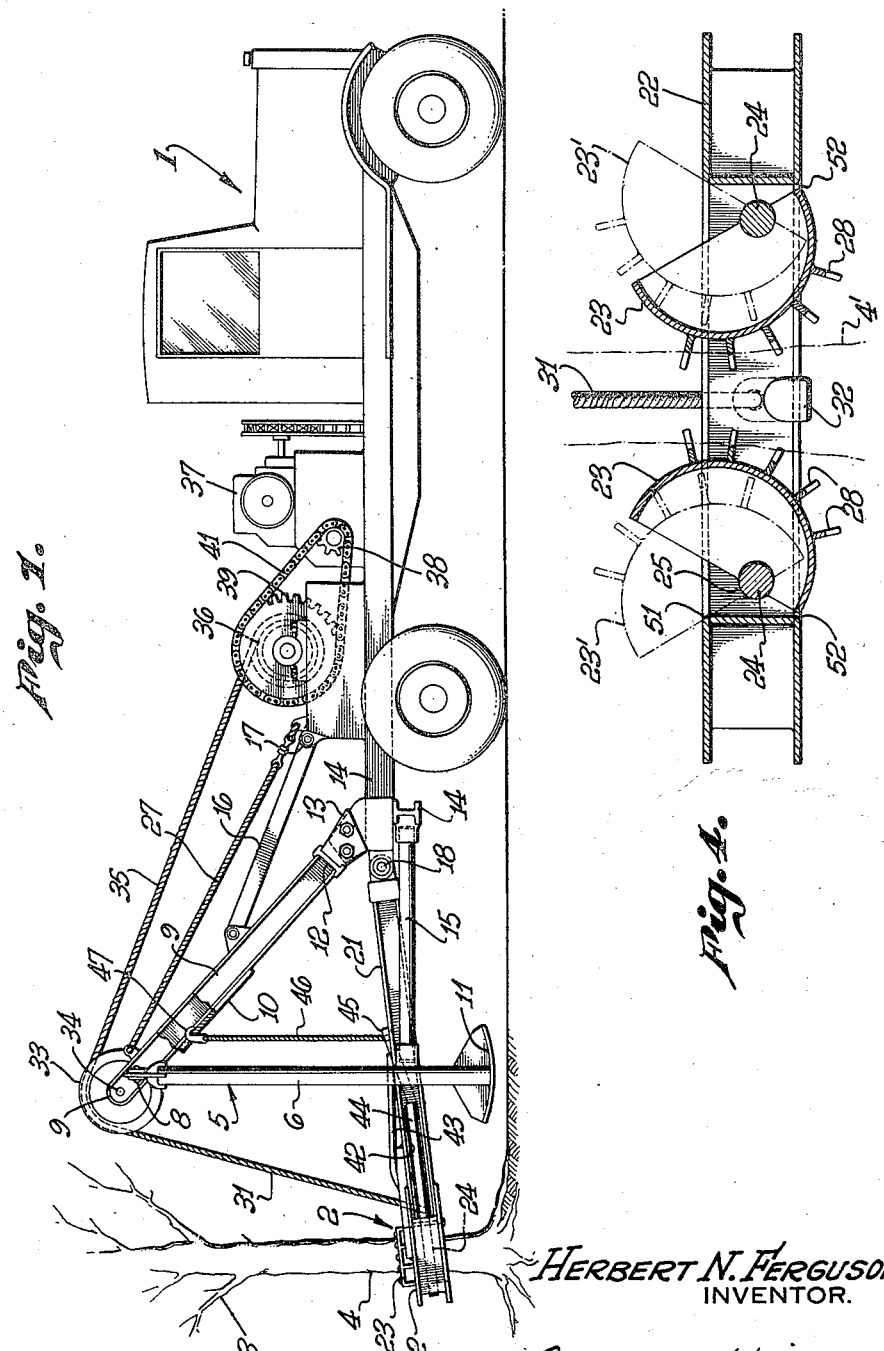
Herbert N. Ferguson
INVENTOR.
BY
ATTORNEY.

Feb. 24, 1948.   H. N. FERGUSON   2,436,510
TREE PULLING APPARATUS
Filed March 24, 1945   2 Sheets-Sheet 2
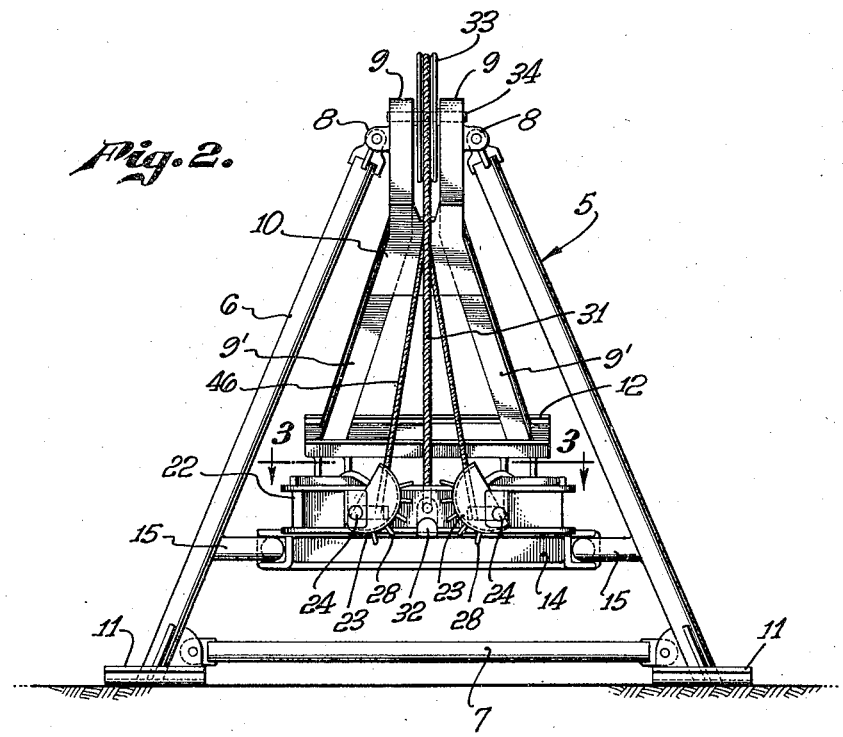
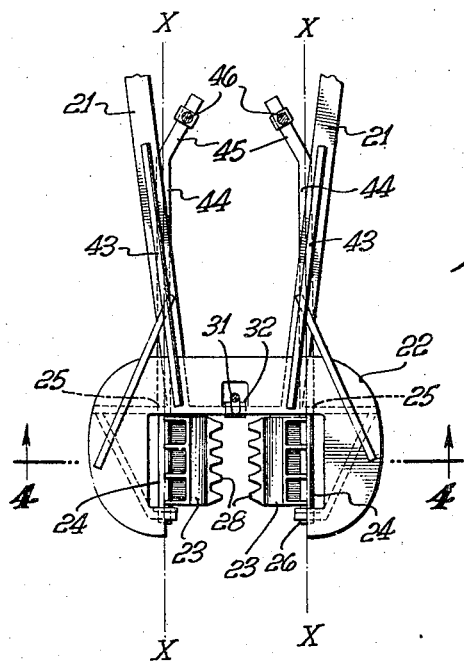
HERBERT N. FERGUSON,
INVENTOR.
BY
ATTORNEY.

Patented Feb. 24, 1948

2,436,510

UNITED STATES PATENT OFFICE 2,436,510

TREE PULLING APPARATUS

Herbert N. Ferguson, Fontana, Calif.

Application March 24, 1945, Serial No. 584,643

2 Claims. (Cl. 254—139.1)

1

This invention relates to an apparatus for pulling trees bodily from the ground, and particularly to an apparatus for this purpose comprising lifting mechanism mounted upon a truck or other wheeled vehicle.

The principal object of the invention is to provide a tree pulling apparatus having tree-pulling means adapted to extend beneath the branches of a tree into position for gripping engagement with the trunk thereof, thus making it possible to pull an entire tree from the ground without requiring the cutting off of the branches or upper part of the tree prior to the pulling operation.

Another object is to provide an apparatus having tree-pulling means provided with cooperating gripping members that are moved inwardly toward one another upon upward movement of said pulling means, whereby said members are brought into more positive gripping engagement with the tree trunk as the lifting operation progresses.

Another object is to provide an apparatus having pulling means adapted for tight gripping engagement with the trunk of a tree, and means for forcibly moving the pulling means substantially straight upward while in such engagement.

Further objects are to provide pulling means having gripping surfaces of such form as to tightly grip and "bite into" a tree trunk, and to provide advantageous means for moving the pulling means to bring such gripping surfaces into and out of gripping position relative to a tree trunk.

Still further objects of the invention will be pointed out hereinafter or will be apparent from the following description.

The accompanying drawings illustrate a preferred form of apparatus by which the desired objects are attained in accordance with this invention. Referring thereto:

Fig. 1 is a side elevation of the apparatus, with the pulling means in a lowered position;

Fig. 2 is a rear end elevation of the pulling means and lifting mechanism, with the pulling means in a substantially horizontal or raised position;

Fig. 3 is a horizontal sectional view taken on line 3—3 in Fig. 2; and

Fig. 4 is an enlarged transverse sectional view on line 4—4 in Fig. 3.

2

Referring particularly to Fig. 1, the tree pulling apparatus is shown as comprising a wheeled vehicle in the form of a motor-driven truck 1, on which is mounted the lifting mechanism including the pulling means indicated generally at 2, whereby the entire apparatus may be transported bodily from place to place, and the pulling means 2 may be brought into a position extending beneath the branches of a tree such as indicated at 3 for engagement with the trunk 4 thereof.

The lifting mechanism is advantageously mounted on the rear portion of the truck 1 and projecting outward therefrom in a rearward direction, as shown, and includes a strong supporting frame 5 disposed rearward of the truck. Said supporting frame is shown as comprising two downwardly and outwardly inclined legs 6 removably secured adjacent their lower ends to a transverse frame member 7, and removably secured at their upper ends, as at 8, to upper frame members 9 which are spaced apart and are rigidly secured together by plate 10. The legs 6 are provided at their lower ends with bearing members or feet 11 of extended surface area adapted for load-supporting engagement with the ground. The frame members 9 are inclined downward and forward, and the forward portions thereof are bent outward as shown at 9' to provide good lateral stability, and are connected to and supported by a transverse member 12 which in turn is connected by brackets 13 to a suitable portion of the truck frame 14 adjacent the rear end thereof.

The frame structure of the lifting mechanism is shown as further comprising lower frame or brace members 15 engaging legs 6 at their rearward ends and engaging the truck frame at their forward ends, and auxiliary frame or brace members 16 engaging the central portions of members 9 at their rearward ends and engaging the truck frame or body as at 17 at their forward ends. I also prefer to provide tension members such as cables 27 secured to the truck frame and to the outer ends of frame members 9.

The pulling means indicated generally at 2 is mounted on the rear end of the truck frame for pivotal movement about a transverse horizontal axis as indicated at 18, so as to swing upward and downward in a vertical plane. Said pulling means is shown as including a heavy lifting frame comprising a pair of longitudinal bars or channel members 21 whose inner or forward ends are pivotally supported at 18 on the truck frame and a generally C-shaped head 22 rigidly secured to the outer or rear ends of said members 21, and a pair of transversely spaced gripping jaws 23 rotatably mounted on said head for movement about substantially parallel longitudinal axes X—X, as by means of shafts 24 rigidly secured to said jaws and rotatably engaging bearing means on head 22 forwardly and rearwardly of the jaws as indicated at 25 and 26 respectively.

The gripping jaws 23 are provided with curved inner faces of generally semi-circular or arcuate configuration directed toward one another and provided with means such as a plurality of serrated projecting ribs or flanges 28 adapted to engage and "bite into" the trunk of a tree at opposite sides thereof, and thus tightly grip such tree trunk, as indicated in dotted lines at 4' in Fig. 4, upon upward movement of head 22 and said jaws. The axes of rotation X—X, defined by shafts 24, are eccentrically disposed with respect to the curved gripping surfaces defined by ribs 28, in such manner that the radial distance or spacing of each gripping surface with respect to its axis of rotation progressively increases in an upward direction, whereby the opposed gripping faces of the coacting jaws 23 are brought closer together as said jaws are rotated downwardly relative to their respective axes.

The lifting mechanism further includes suitable means operable by a motor or power unit mounted on the vehicle and adapted to exert an upward pull or lifting action on the pivoted lifting frame adjacent the outer end thereof. For this purpose, I have shown a flexible tension member in the form of a cable 31 whose lower end is secured to head 22 by means of hook 32. Said cable extends over a pulley 33 disposed between the upper ends of frame members 9 and rotatably mounted thereon by means of shaft 34. From said pulley the cable extends downward and forward as indicated at 35 and passes over a winding drum indicated at 36, which is operated by a motor-driven power unit 37 mounted on the vehicle 1 and connected to said drum by suitable drive mechanism shown as including sprockets 38 and 39 and chain 41.

For controlling the movement of the rotatable gripping jaws 23. I prefer to provide suitable means engaging the shafts thereof and operable to rotate the gripping jaws upward relative to their axes of rotation when the pivoted lifting frame is lowered, and to cause said jaws to swing downward relative to their respective axes as the lifting frame is raised, thus automatically opening and closing the jaws upon such downward and upward movement of the pivoted lifting frame.

For this purpose, the centers of gravity of the respective jaws 23 are located inwardly of their axes of rotation, so that said jaws are biased downwardly by gravity about their respective axes. The shafts 24 are extended forwardly as indicated at 44, and the forward ends thereof are bent inward as indicated at 45 to provide radially extending crank arms.

The shaft extensions 44 pass through slots 42 in channel members 21, and reinforcing rods or truss members 43 are preferably provided which span the slotted portions of said channel members and are secured at their front ends to said channel members and at their rear ends to pulling head 22. Tension members such as cables 46 are secured to the respective crank arms 45, and the upper ends of said tension members may be secured in any suitable manner as by means of hooks or other attaching means 47 engaging the upper edge of plate 10. The length of the tension members 46 may be so adjusted that, when the pulling means 2 is lowered by cable 31, about its axis 18, as indicated in Fig. 1, the tension members 46 exert an upward pull on crank arms 45 and rotate the jaws 23 upward about their respective axes so as to move the jaws apart from one another as indicated in dot-dash lines at 23' in Fig. 4. With the parts in this position, the vehicle may be moved so as to bring the jaws into position at opposite sides of the tree trunk 4, as shown in Fig. 1. The cable 31 is then operated by winding drum 36 so as to swing the pulling means 2 upward about the axis 18, whereupon the weight of jaws 23 causes them to swing downward about their respective axes X—X, into position of gripping engagement with the tree trunk as indicated at 4' in Fig. 4.

Suitable shoulders or stop means are provided on head 22, as indicated at 51 and 52, for limiting the rotative movement of jaws 23.

In operation, the apparatus is operated to grip the trunk of a tree between jaws 23 as described above, and continued operation of drum 36 exerts an upward pull on the tree through cable 31. The downward thrust thus exerted on pulley 33 causes the supporting frame structure 5 to move downward about the rear wheels of the truck, lifting the forward portion of the truck, until the load-bearing feet 11 engage the ground. The lifting mechanism then operates through cable 31 and pulling means 2 to pull the tree bodily from the ground.

After being raised clear of the ground, the tree may be carried in this raised position and the truck driven to a suitable point for dumping the tree, or may be raised by the lifting mechanism to a sufficient height off the ground for loading onto another truck. In either case, the tree can be readily disengaged from the jaws by releasing the pull on cable 31 and opening the jaws 23.

I claim:

1. A tree pulling apparatus comprising: a vehicle; pulling means pivotally mounted on said vehicle for swinging movement about a horizontal axis and extending outward from said vehicle in a substantially horizontal direction, whereby the outer end thereof moves substantially vertically upon such swinging movement; power means mounted on said vehicle; lifting mechanism operable by said power means and connected to said pulling means for swinging said pulling means upward about said horizontal axis; two spaced coacting jaws provided with curved gripping faces directed toward one another, mounted on said pulling means adjacent the outer end thereof for rotation about substantially parallel axes eccentric with respect to said faces, and biased downwardly about said axis by gravity; the spacing of said faces from the respective axes of rotation of said jaws increasing progressively in an upward direction; and means cooperating with said jaws to cause them to rotate upward about their respective axes upon downward movement of said pulling means and to permit them to rotate downward about their respective axes upon upward movement of said pulling means.

2. In a tree pulling apparatus, the combination comprising: a frame structure mounted for upward and downward movement; two spaced coacting jaws provided with curved gripping faces directed toward one another and mounted on said frame structure for rotation about substantially parallel longitudinal axes eccentric with respect to said faces, said jaws being biased downward about their respective axes by gravity, and the spacing of said faces from the respective axes of rotation increasing progressively in an upward direction; and means cooperating with said jaws and operable to cause them to rotate upward about their respective axes upon downward movement of said frame structure, and to permit them to rotate downward about their respective axes upon upward movement of said frame structure.

HERBERT N. FERGUSON.

REFERENCES CITED

The following references are of record in the file of this patent:

UNITED STATES PATENTS

| Number | Name | Date |
|---|---|---|
| 73,482 | Woodworth | Jan. 21, 1868 |
| 331,054 | Heard | Nov. 24, 1885 |
| 676,599 | Bergom | June 18, 1901 |
| 701,519 | Sleeter | June 3, 1902 |
| 1,981,308 | Copley | Nov. 20, 1934 |

FOREIGN PATENTS

| Number | Country | Date |
|---|---|---|
| 598,546 | France | Sept. 29, 1925 |